(12) United States Patent
Lee et al.

(10) Patent No.: US 9,787,584 B2
(45) Date of Patent: Oct. 10, 2017

(54) DATA TRANSMISSION RESERVATION METHOD AND APPARATUS, DATA RECEPTION METHOD AND APPARATUS, AND DATA TRANSMISSION AND RECEPTION SYSTEM IN RECEIVER-INITIATED ASYNCHRONOUS MEDIUM ACCESS CONTROL PROTOCOL

(71) Applicant: RESEARCH & BUSINESS FOUNDATION SUNGKYUNKWAN UNIVERSITY, Suwon-si (KR)

(72) Inventors: Tae Jin Lee, Suwon-si (KR); Ji Hyoung Ahn, Suwon-si (KR); Min Gyu Lee, Seongnam-si (KR); Se Houn Lee, Uiwang-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 211 days.

(21) Appl. No.: 14/750,830

(22) Filed: Jun. 25, 2015

(65) Prior Publication Data
US 2015/0381518 A1 Dec. 31, 2015

(30) Foreign Application Priority Data
Jun. 27, 2014 (KR) .................. 10-2014-0080197

(51) Int. Cl.
*H04L 12/911* (2013.01)
*H04L 12/801* (2013.01)
*H04L 12/721* (2013.01)
*H04W 74/06* (2009.01)

(52) U.S. Cl.
CPC ............ *H04L 45/566* (2013.01); *H04L 47/14* (2013.01); *H04L 47/72* (2013.01); *H04W 74/06* (2013.01)

(58) Field of Classification Search
None
See application file for complete search history.

(56) References Cited

U.S. PATENT DOCUMENTS

| | | | |
|---|---|---|---|
| 8,711,830 B2* | 4/2014 | Wason | H04W 74/002 370/347 |
| 2008/0259895 A1* | 10/2008 | Habetha | H04W 74/04 370/345 |
| 2009/0168744 A1* | 7/2009 | Park | H04W 74/006 370/349 |

(Continued)

FOREIGN PATENT DOCUMENTS

| | | |
|---|---|---|
| KR | 10-2005-0089700 A | 9/2005 |
| KR | 10-2011-0039859 A | 4/2011 |

OTHER PUBLICATIONS

Korean Office Action issued Dec. 23, 2014 in counterpart Application No. KR 10-2014-0080197 (6 pages, in Korean).

*Primary Examiner* — Candal Elpenord
(74) *Attorney, Agent, or Firm* — NSIP Law

(57) ABSTRACT

According to the present invention, there is disclosed a method for reserving data transmission from a transmitting node to a receiving node in a receiver-initiated asynchronous MAC (Medium Access Control) protocol. The method includes receiving a base beacon frame from the receiving node and when transmitting a data frame to the receiving node, transmitting the data frame, with a reserved field value set in a portion of a header of the data frame.

15 Claims, 9 Drawing Sheets

(56) References Cited

U.S. PATENT DOCUMENTS

| | | | |
|---|---|---|---|
| 2010/0034159 A1* | 2/2010 | Shin | H04W 72/1257 370/329 |
| 2010/0110981 A1* | 5/2010 | Shao | H04W 76/023 370/328 |
| 2013/0051256 A1* | 2/2013 | Ong | H04W 74/0816 370/252 |
| 2014/0092857 A1* | 4/2014 | Kneckt | H04W 74/04 370/329 |

* cited by examiner

Conventional

DATA TRANSMISSION RESERVATION METHOD AND APPARATUS, DATA RECEPTION METHOD AND APPARATUS, AND DATA TRANSMISSION AND RECEPTION SYSTEM IN RECEIVER-INITIATED ASYNCHRONOUS MEDIUM ACCESS CONTROL PROTOCOL

CLAIM FOR PRIORITY

This application claims priority to and benefit under 35 U.S.C. §119(a) of Korean Patent Application No. 10-2014-0080197, filed on Jun. 27, 2014 in the Korean Intellectual Property Office, the disclosure of which is incorporated herein by reference in its entirety.

BACKGROUND

1. Technical Field

The present invention relates to Medium Access Control (MAC) protocols in wireless network environments, and more specifically, to methods for reducing collision between transmitted packets by applying for a transmission reservation of a transmitting node to schedule the order of transmitting nodes.

2. Related Art

Unlike wired communication, wireless communication features that all the nodes share a medium, air, by the nature of radio waves spreading in all directions. Accordingly, what is critical for wireless communication is a Medium Access Control (MAC) protocol that enables reliable communication by reducing interference and collision that may be caused upon using shared resources.

Among others, MAC protocols using a duty cycling scheme in which a node is periodically rendered in sleep mode to reduce the power consumption of the node may largely come in a synchronous mode and an asynchronous mode depending on sleep mode switching methods. Synchronous MAC protocols are MAC protocols in which all of the nodes constituting a network share the same sleep mode switching period and switching time. In other words, all of the nodes simultaneously switch sleep mode and stay in sleep mode for the same time. The synchronous MAC protocols have a shorter transmission delay time than that of asynchronous MAC protocols but have increased protocol overhead due to control frames that should be periodically transmitted for sleep mode synchronization. In contrast, the asynchronous MAC protocols are MAC protocols in which each node freely manages the period and time when the node switches to sleep mode. The asynchronous MAC protocols do not require sleep period synchronization and thus have a reduced protocol overhead due to control frame exchange. Further, the asynchronous MAC protocols have the merit that each node may freely determine its sleep period considering the characteristics of each node, i.e., available energy or capacity of transmission buffer.

The asynchronous MAC protocols may be classified into transmitter-initiated protocols and receiver-initiated protocols depending on the node that initiates communication. A representative receiver-initiated protocol is the Receiver-Initiated MAC (RI-MAC) protocol. All the nodes, if the sleep period ends, inform that they are ready to receive by broadcasting base beacon frames. Transmitting nodes, if there occurs a data frame they are to send, terminate sleep mode and wake up, and wait until they receive base beacon frames from a potential receiving node of the data frame. When receiving the base beacon frames from the receiving node, the transmitting nodes transmit data frames. When the receiving node successfully receives the data frame supposed to be transmitted thereto after the base beacon frame has been broadcast, acknowledge beacon frames are broadcast to inform that the receiving node has received the data frame while informing the potential transmitting nodes that the receiving node is ready to receive. The response beacon frame includes the address of the node that has transmitted the data frame and thus the transmitting node that has received the response beacon frame may identify whether the data the transmitting node has sent is transmitted without trouble. When failing to successfully receive the data frame that is transmitted to the receiving node, e.g., for the reason that multiple transmitting nodes transmit data frames to the receiving node simultaneously, the receiving node broadcasts the response beacon frames containing a non-zero backoff window value. The transmitting nodes receive the response beacon frames containing the backoff window value and select arbitrary times respectively within a range designated by the backoff window value, and in case none of the transmitting nodes transmit data frames during the time, transmit their data frames. In the case of a response beacon frame broadcast when the data frame is normally received or a base beacon frame broadcast when the sleep period ends, the backoff window value may be set to 0 and may be sent. When the backoff window value is 0, the transmitting nodes receiving the beacon frames may immediately transmit their data frames.

FIG. 1 is a view illustrating a receiver-initiated asynchronous MAC protocol in a network environment where a plurality of transmitting nodes are present.

Referring to FIG. 1, a plurality of transmitting nodes (node 2 120 and node 3 130) transmit data to a receiving node 110. In this example, the environment includes two transmitting nodes and one receiving node. However, the present invention is not limited thereto and may apply to an environment where more than three nodes are present.

A network 100 may be a sensor network including a plurality of sensor nodes. The nodes may communicate data through M2M (Machine to Machine) and IoT (Internet of Things)-based short range communication. The nodes may be mobile nodes or sensor nodes. In the receiver-initiated MAC protocol, the transmitting nodes initiate data transmission by the beacon frame of the receiver, i.e., the receiving node, node 1 110. When the plurality of transmitting nodes (node 2 120 and node 3 130) receiving the beacon frame simultaneously perform data transmission, a collision may occur, causing waste of resources used for data transmission. In particular, since sensor nodes constituting a sensor network have limited available energy, it is required to consider collision when designing an MAC protocol.

FIG. 2 is a view illustrating an operational example of the prior art when data frames collide with each other in an environment where a plurality of transmitting nodes (node 2 220 and node 3 230) are present.

Referring to FIG. 2, it is assumed that node 2 220 and node 3 230 each intend to transmit data frames to node 1 210. Because node 2 220 and node 3 230 wake up before node 1 210 starts to transmit a base beacon frame, node 2 220 and node 3 230 stay in standby mode, and after receiving the base beacon frame, transmit data frames so that a collision occurs. Node 1 210 senses the collision in the received data frame and transmits a response beacon frame containing a backoff window value. When receiving the response beacon frame, node 2 220 and node 3 230 start backoff contention. Since node 2 220 and node 3 230 respectively select 2 and 9 so that node 2 220 wins the contention. Accordingly, communication of the data frame and communication of the response beacon frame are sequentially performed. Node 2 220, because of having one more data frame left to send, receives the response beacon frame and then re-starts backoff contention with node 3 in order to have a chance to transmit a data frame. Node 2 220 and node 3 230 respectively select 4 and 3, and thus, node 3 230 wins the contention and transmission of the data frame and reception of the response beacon frame are performed. Node 3 230 which has no more data frame to send receives the response beacon frame and then switches to sleep mode. Node 2 220, after receiving the response beacon frame, wins the backoff contention and succeeds in transmission of a second data frame and reception of the response beacon frame. Node 2 220 has no more data frame to send and switches to sleep mode. Node 1 210 waits a predetermined time (dwell time) after the response beacon frame is broadcast, and if no data frame is received, switches to sleep mode. While node 1 210 is in sleep mode, node 2 220 and node 3 230 have data frames to send and wake up out of sleep mode, and node 1 210 ends sleep mode and broadcasts a base beacon frame. When receiving the base beacon frame from node 1 210, node 2 220 and node 3 230 happen to simultaneously transmit data frames to send so that collision occurs in node 1 210.

According to the prior art, since in a network having light data traffic, transmitting nodes spend most of the time in sleep mode, consumed power may be further reduced as compared with the synchronous protocol, but in the case where there is heavy data traffic as shown in FIG. 2, frequent collision and re-transmission may occur. Collision and its resultant re-transmission may lead to an increase in energy consumption and a reduction in throughput performance to both the transmitting and receiving nodes, and in the case of a sensor network, nodes may have reduced lifespan and network disconnectivity.

SUMMARY

In some example embodiments of the present invention, a method for reserving data transmission from a transmitting node to a receiving node in a receiver-initiated asynchronous MAC (Medium Access Control) protocol includes receiving a base beacon frame from the receiving node and when transmitting a data frame to the receiving node, transmitting the data frame, with a reserved field value set in a portion of a header of the data frame.

The transmitted data frame may include frame type information, destination information, source information, reserved field value information, and data.

When there is additional data to be sent, the reserved field value may be set to 1, and otherwise, the reserved field value may be set to 0.

The method for reserving data transmission may further include receiving a response beacon frame from the receiving node and identifying address information contained in a reserved field of the response beacon frame to determine whether a reserved transmitting node is designated.

Identifying the address information contained in a reserved field of the response beacon frame to determine whether the reserved transmitting node is designated may includes one of when the reserved field of the response beacon frame includes address information inconsistent with address information of the transmitting node, holding data transmission in a corresponding reserved period of a next duty cycle and when the reserved field of the response beacon frame includes address information consistent with the address information of the transmitting node or broadcast address information, transmitting a data frame during the reserved period.

The reserved period may be a designated contentious period of the duty cycle and may be a period agreed on between the transmitting node and the receiving node.

The transmitting node and the receiving node may be apparatuses operating in a sensor network.

In some example embodiments of the present invention, an apparatus for reserving data transmission to a receiving node in a receiver-initiated asynchronous Medium Access Control (MAC) protocol includes a receiving unit receiving a base beacon frame from the receiving node and a transmitting unit transmitting a data frame to the receiving node, wherein the transmitted data frame is transmitted, with a reserved field value set in a portion of a header of the data frame.

In some example embodiments of the present invention, a method for receiving data by a receiving node from at least one transmitting node in a receiver-initiated asynchronous Medium Access Control (MAC) protocol includes broadcasting a base beacon frame to the at least one transmitting node, receiving a data frame from the at least one transmitting node, parsing whether there is a reserved field value contained in a header of the received data frame to generate a response beacon frame, and transmitting the response beacon frame to the at least one transmitting node.

Generating the response beacon frame may include simultaneously receiving at least two data frames to sense a collision and including a backoff window value in the response beacon frame to generate the response beacon frame.

Generating the response beacon frame may include parsing whether the reserved field value of the received data frame is set to 1, when there is a first transmitting node having performed transmission with the reserved field value set to 1, adding the first transmitting node to a reservation table, and setting an address of the first transmitting node in the reserved field of the response beacon frame by referencing the reservation table to generate the response beacon frame.

The method for receiving data may further include, when the receiving node that wakes up after a corresponding duty cycle has been ended, transmits a base beacon frame of a next duty cycle, setting the address of the first transmitting node in the reserved field by referencing the reservation table and transmitting the same.

When there are a plurality of first transmitting nodes that set the reserved field value to 1 and transmit the same, a priority of a transmitting node of the plurality of first transmitting nodes requesting a reservation through a data frame transmitted in a period other than a reserved period may be higher than a priority of a transmitting node of the plurality of first transmitting nodes requesting a reservation through a data frame transmitted in the reserved period.

When adding the first transmitting node to the reservation table, an address and priority information of the first transmitting node may be added together, and upon generation of the response beacon frame, an address of a first transmitting node with a highest priority may be included, and the first transmitting node may be deleted from the reservation table.

The reserved period may be a designated contentious period of the duty cycle and may be a period agreed on between the transmitting node and the receiving node.

In some example embodiments of the present invention, an apparatus for receiving data from at least one transmitting node in a receiver-initiated asynchronous Medium Access Control (MAC) protocol includes a transmitting unit broadcasting a base beacon frame or a response beacon frame to the at least one transmitting node, a receiving unit receiving a data frame from the at least one transmitting node, and a controller parsing a reserved field value included in a header of the received data frame to generate a response beacon frame.

In some example embodiments of the present invention, a system for communicating data between at least one transmitting node and a receiving node in a receiver-initiated asynchronous MAC (Medium Access Control) protocol includes at least one transmitting node receiving a base beacon frame or response beacon frame from the receiving node and transmitting a data frame to the receiving node with a reserved field value set in a portion of a header of the transmitted data frame and a receiving node transmitting a base beacon frame or a response beacon frame to the at least one transmitting node, receiving a data frame from the at least one transmitting node, and parsing the reserved field value included in the header of the received data frame to generate a response beacon frame.

In some example embodiments of the present invention, by the data transmission reservation method and apparatus in the receiver-initiated asynchronous MAC protocol, data receiving method and apparatus, and data communication system, transmitting nodes may wait for calling a reservation by a receiving node to successfully transmit data frames without backoff contention, collision and its resultant re-transmission.

Accordingly, unnecessary re-transmission is reduced. Thus, the network throughput performance may be increased. Energy consumption efficiency may be enhanced due to reduced energy required for re-transmission.

DESCRIPTION OF EXAMPLE EMBODIMENTS OF THE PRESENT INVENTION

Figure 1:
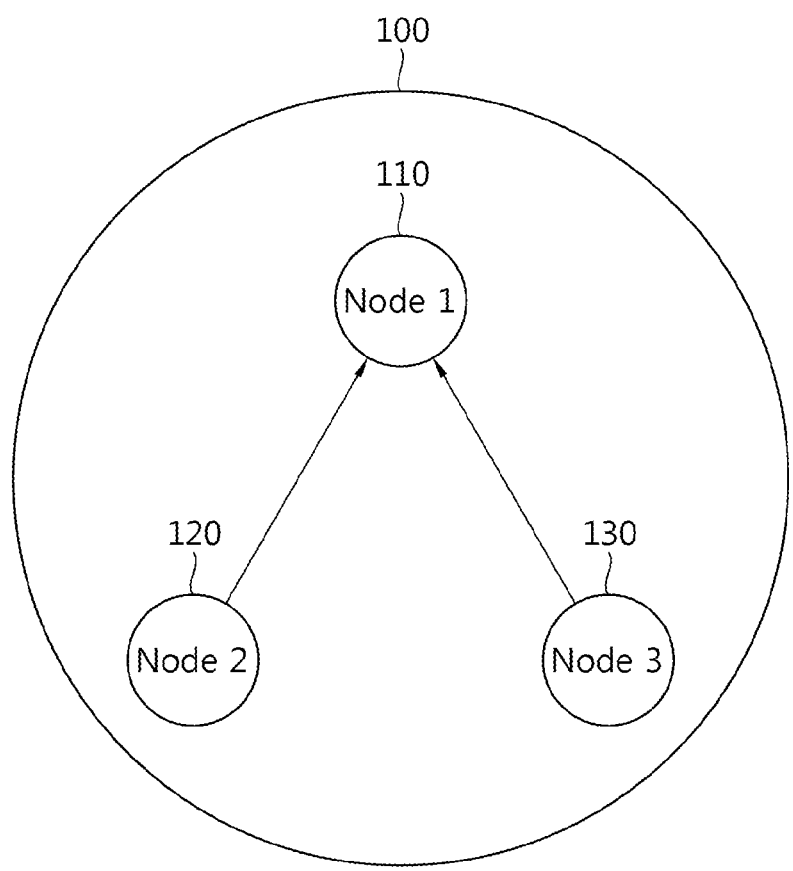
FIG. 1 is a view illustrating a receiver-initiated asynchronous MAC protocol in a network environment where a plurality of transmitting nodes are present.
Figure 2:
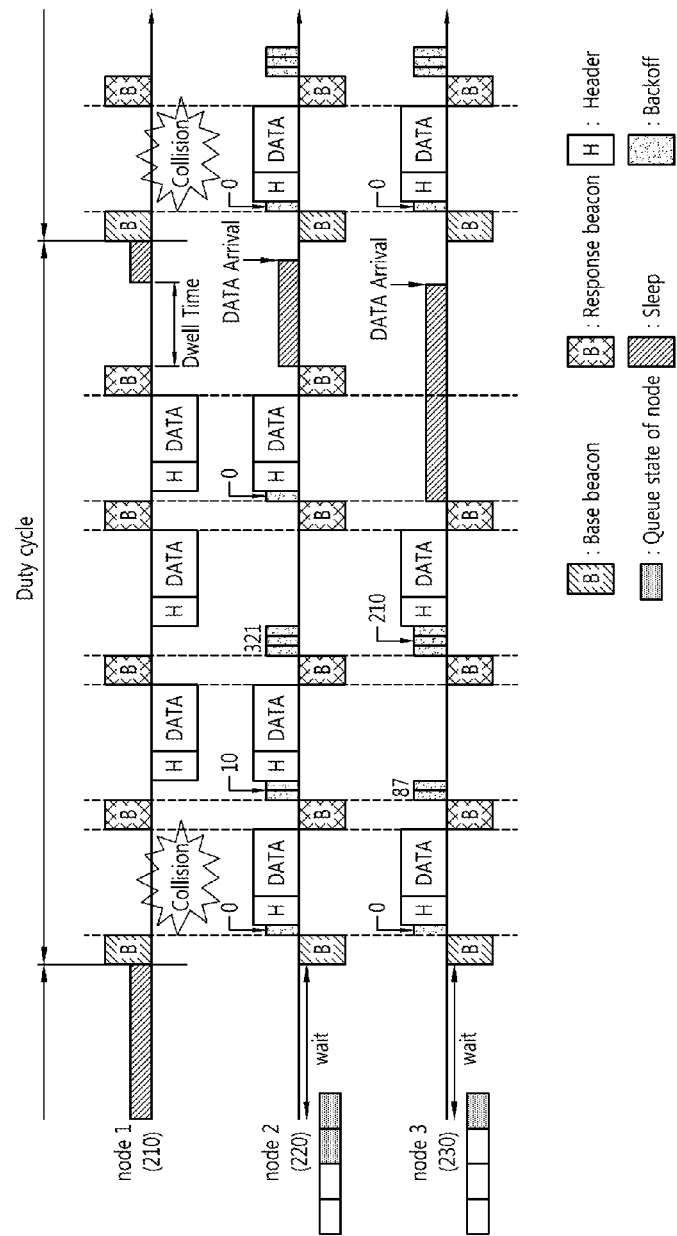
FIG. 2 is a view illustrating an operational example in which data frames collide with each other in an environment where a plurality of transmitting nodes are present according to the prior art.

Various changes may be made to the present invention, and the present invention may have various example embodiments. Specific example embodiments are described in detail with reference to the accompanying drawings.

However, it should not be construed as limited to the embodiments, and all variations, equivalents, and replacements thereof are to be regarded as being within the scope of the present invention.

The terms "first" and "second" may be used to describe various elements. The elements, however, are not limited to the above terms. In other words, the terms are used only for distinguishing an element from others. Accordingly, a "first element" may be named a "second element," and vice versa. The term "and/or" includes a combination of a plurality of relevant elements as described or any one of a plurality of relevant items as described.

When an element is "connected to" or "coupled to" another element, the element may be directly connected or coupled to the other element or other elements may intervene. In contrast, when an element is "directly connected" or "directly coupled" to another element, it should be understood that there is no intervening element therebetween.

The terms used herein are used for the illustrative purposes and are not intended to limit the present invention. A singular term includes a plural term unless otherwise stated. As used herein, the terms "include" or "have" are used to indicate that there are features, numerals, steps, operations, components, parts or combinations thereof as described herein, but do not exclude the presence or possibility of addition of one or more features, numerals, steps, operations, components, parts or components thereof.

Unless defined otherwise, all of the terms used herein including technical or scientific terms are the same in meaning as those generally understood by one of ordinary skill in the art to which the present invention pertains. The terms as defined in the dictionary commonly used should be interpreted to comply with the meanings in the context of the related art, and unless clearly defined otherwise, the terms should not be interpreted too formally or ideally.

Hereinafter, preferred embodiments of the present invention are described in detail with reference to the drawings. For an easier understanding of the disclosure, the same reference numerals are used to refer to the same elements throughout the drawings, and no repetitive description of the same elements is given.

The present invention relates to a receiver-initiated asynchronous MAC protocol and may prevent a lowering in throughput performance or energy consumption due to collision and re-transmission when there is heavy data traffic through transmission chance reservation. Rather than a reservation request and response being present as a separate control message, a reservation operation may be performed through the header of a beacon frame and data.

Figure 3:
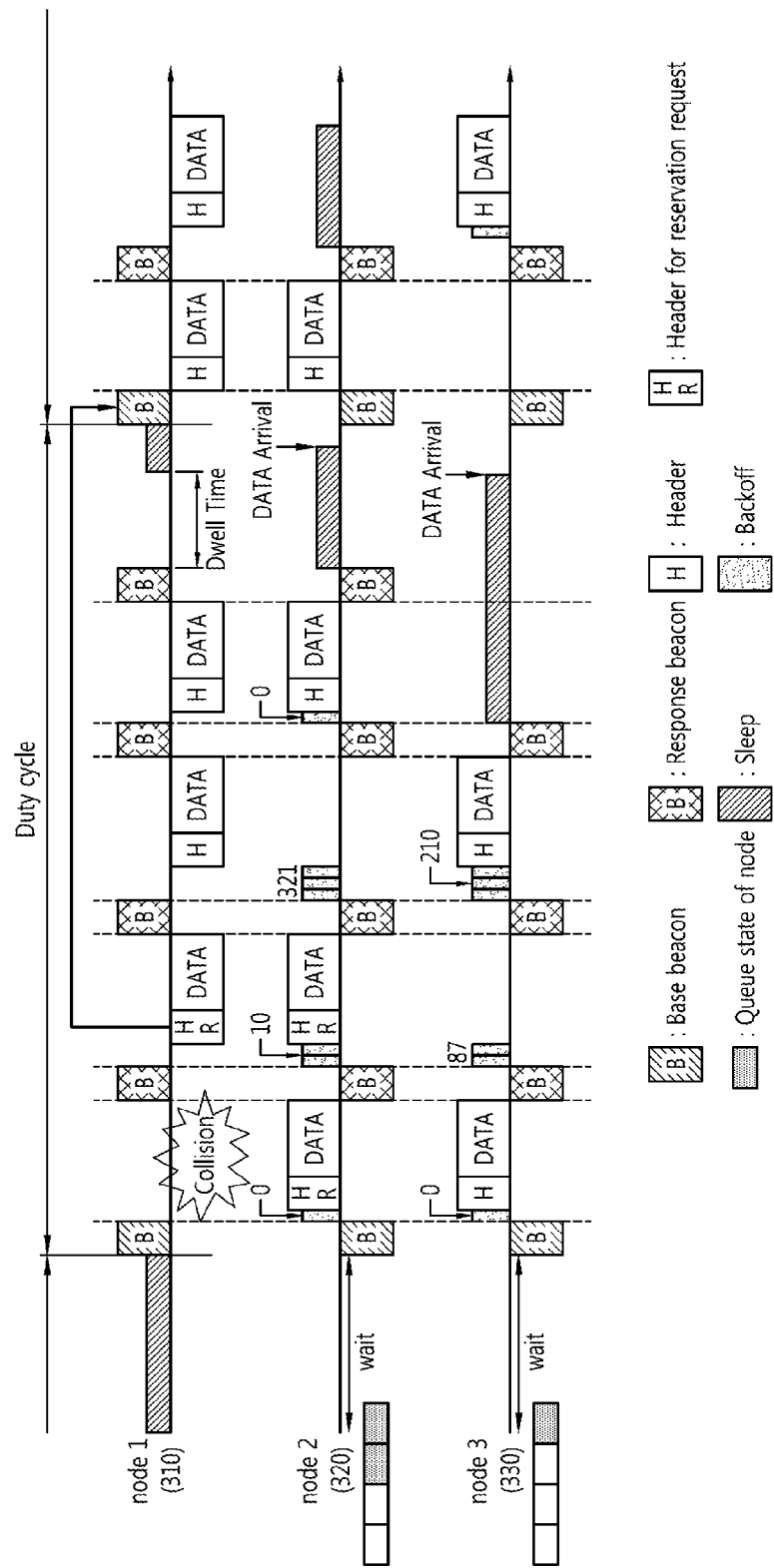
FIG. 3 is a view illustrating a method for reserving data transmission in a receiver-initiated asynchronous MAC protocol according to an example embodiment of the present invention.

FIG. 3 is a view illustrating a method for reserving data transmission in a receiver-initiated asynchronous MAC protocol according to an example embodiment of the present invention.

Referring to FIG. 3, it is assumed that node 2 320 and node 3 330, respectively, have two data and one data to send to node 1 310. Node 2 320 has two data to send, and thus, node 2 320 generates a data frame with the reserved field of the header set to 1 in order to reserve a transmission chance. Node 1 310 identifies that the reservation table is empty when its sleep period ends and node 1 310 wakes up, and node 1 310 broadcasts a base beacon frame with the reserved field set to a broadcast address. Node 2 320 and node 3 330, after receiving the base beacon frame from node 1 310, identify the reserved field value, and since the reserved field value is the broadcast address, they determine that no reservation transmitting node is designated and simultaneously transmit data frames. Accordingly, a collision occurs. Node 1 310 senses the collision and puts a backoff window value in the beacon frame and broadcasts the beacon frame. Node 2 320 that wins the backoff contention successfully transmits its data frame. Since the reserved field is set in the header of the transmitted data frame, node 1 310 adds the address of node 2 320 to the reservation table. Thereafter, node 3 330 and node 2 320 sequentially transmit data frames without collision through backoff contention, and node 1 310 identifies that none of the nodes have transmitted data to node 1 310 for a predetermined time and switches to sleep mode.

While node 1 310 operates in sleep mode, node 2 320 and node 3 330 happen to have packets to send to node 1 310 and wake up out of sleep mode to wait for a base beacon frame or response beacon frame from node 1 310. Node 1 310 that ends sleep mode and wakes up sets the reserved field to the address of node 2 320 by referencing the reservation table and broadcasts base beacon frames. When receiving the base beacon frame, node 2 320 identifies that its address is consistent with the reserved field value of the base beacon frame and transmits a data frame. However, node 3 330, because the reserved field value is not the broadcast address and its address is not consistent with the reserved field value, holds transmission of a data frame and waits for a beacon frame from node 1 310. In other words, after the reserved field value has been set in the previous duty cycle so that a reservation has been successfully made, the receiving node (in this example embodiment, node 1 310) includes the address of the node successfully having made a reservation (in this example embodiment, node 2 320) in the base beacon frame of a next duty cycle and sends the base beacon frame. Then, node 2 320 may perform transmission without collision because all of the ambient nodes in the network are aware that the period is a reserved period for node 2 320 and hold their transmission in the reserved period. Here, the term "reserved period" is a contention period designated within one duty cycle and may be a period agreed on between the transmitting node and the receiving node. In the example embodiment of the present invention, it is set as the first contention period of the duty cycle, but the present invention is not limited thereto.

After transmission of the data frame from node 2 320 has been successfully done by transmission reservation, node 2 320 has no more packets to send, and thus, after receiving the response beacon from node 1 310, switches to sleep mode. Node 3 330 that, after receiving the base beacon frame from node 1 310, holds transmission of a data frame, receives the response beacon broadcast from node 1 310 after the transmission of the data frame from node 2 320 is ended. Since the reserved field in the response beacon is set to the broadcast address, a data frame is transmitted after performing backoff contention.

Figure 4:
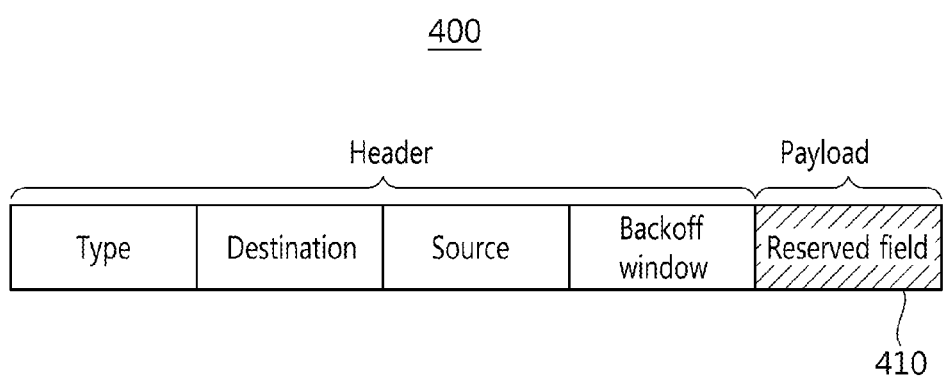
FIG. 4 is a view illustrating the format of a beacon frame used in a method for reserving data transmission in a receiver-initiated asynchronous MAC protocol according to an example embodiment of the present invention.

FIG. 4 is a view illustrating the format of a beacon frame 400 used in a method for reserving data transmission in a receiver-initiated asynchronous MAC protocol according to an embodiment of the present invention.

Referring to FIG. 4, the beacon frame 400 is a frame in which a receiving node informs that it is ready to receive data and includes a frame header containing a frame type field, a destination field, a source field, and a backoff window and a payload including a reserved field 410.

The frame type field is a field indicating whether the frame is a beacon frame 400. This field allows for differentiation as to whether a transmitted frame is a beacon frame or data frame.

The destination field is a field for acknowledging a response to a data frame received immediately before. The destination field may include the address of a source node transmitting a data frame or a broadcast address for broadcasting.

The source field may contain address information on the source of a current frame. That is, the source field may include address information on the receiving node transmitting the beacon frame 400.

The backoff window field designates a range of the backoff window. As described above, when sensing a collision, the receiving node may put a non-zero backoff window value in the beacon frame 400 and broadcast the beacon frame 400. In this case, a minimum backoff window value may be set. When data reception is successfully done without collision, the transmission may be done with the backoff window value set to 0.

The reserved field 410 may be included in the payload part of the beacon frame 400. That is, the address of the reserved node may be contained in the reserved field 410 corresponding to the payload part and may be transmitted. To that end, the transmitting node side receiving the beacon frame 400 from the receiving node compares its address with the reserved field 410 value, and if the values are consistent with each other or only when the reserved field 410 value is the broadcast address, may transmit its data frame. If there is no reserved node, the reserved field 410 of the response beacon frame or base beacon frame may be set to the broadcast address and may be sent. In this case, all of the transmitting nodes receiving the beacon frame 400 may attempt transmission through backoff contention.

Figure 5:
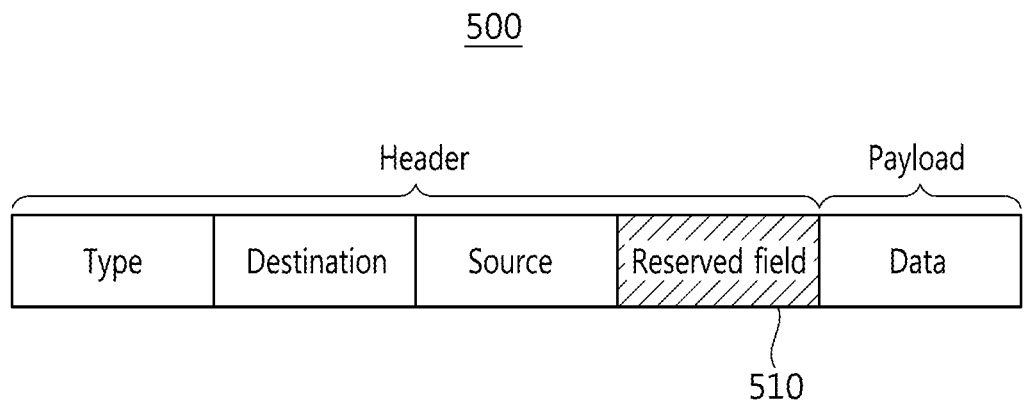
FIG. 5 is a view illustrating the format of a data frame used in a method for reserving data transmission in a receiver-initiated asynchronous MAC protocol according to an example embodiment of the present invention.

FIG. 5 is a view illustrating the format of a data frame 500 used in a method for reserving data transmission in a receiver-initiated asynchronous MAC protocol according to an example embodiment of the present invention.

Referring to FIG. 5, according to an example embodiment of the present invention, the data frame 500 is a frame that may also contain a reservation message while being in charge of data transmission and may include a data header containing a frame type field, a destination field, a source field, and a reserved field 510 and a payload containing data.

The frame type field is a field indicating whether the frame is a data frame 500. This field allows for differentiation as to whether a transmitted frame is a beacon frame or data frame.

The destination information may include address information on the destination to which transmission is performed, and the source information may include address information on the transmitting node transmitting a data frame.

The reserved field 510 is set to 1 if there is additional data to be sent or to 0 otherwise. When receiving the data frame 500 with the reserved field 510 set to 1, the receiving node assigns a transmission chance to the node in a next reserved period.

Using the data frame 500 format, the transmitting node may set the reserved field 510 included in the header of the data frame 500 to 1 and send the data frame 500 to request the receiving node to reserve a transmission chance. When successfully receiving the data frame 500, the receiving node identifies that the reserved field 510 of the frame header is set to 1 and obtains the address of the node having sent the data frame by referencing the address contained in the source field of the header to add the same to its reservation table.

According to an example embodiment of the present invention, configurations such as the size of the reservation table or priority of reservation may be arbitrarily set in a step for implementing the present invention. Each node may induce the reserved node to attempt transmission by including the addresses of the reserved nodes stored in its reservation table in the base beacon frame or response beacon frame. The reservation table may be recorded in a First-In First-Out (FIFO) manner. That is, the address of a transmitting node of a data frame transmitted with the reserved field set to 1 is recorded earlier than that of a transmitting node of a data frame transmitted later, and when a receiving node allocates a reserved period, the earlier may be allocated before the later. Further, in order to prevent one node from continuing to transmit data frames as the reserved field of the data frame transmitted in the reserved period is set to 1, the reservation request included in the data frame transmitted in the reserved period may preferably have a lower priority than the reservation request contained in the data frame transmitted in a period other than the reserved period. Such configuration may be varied through a user interface.

Figure 6:
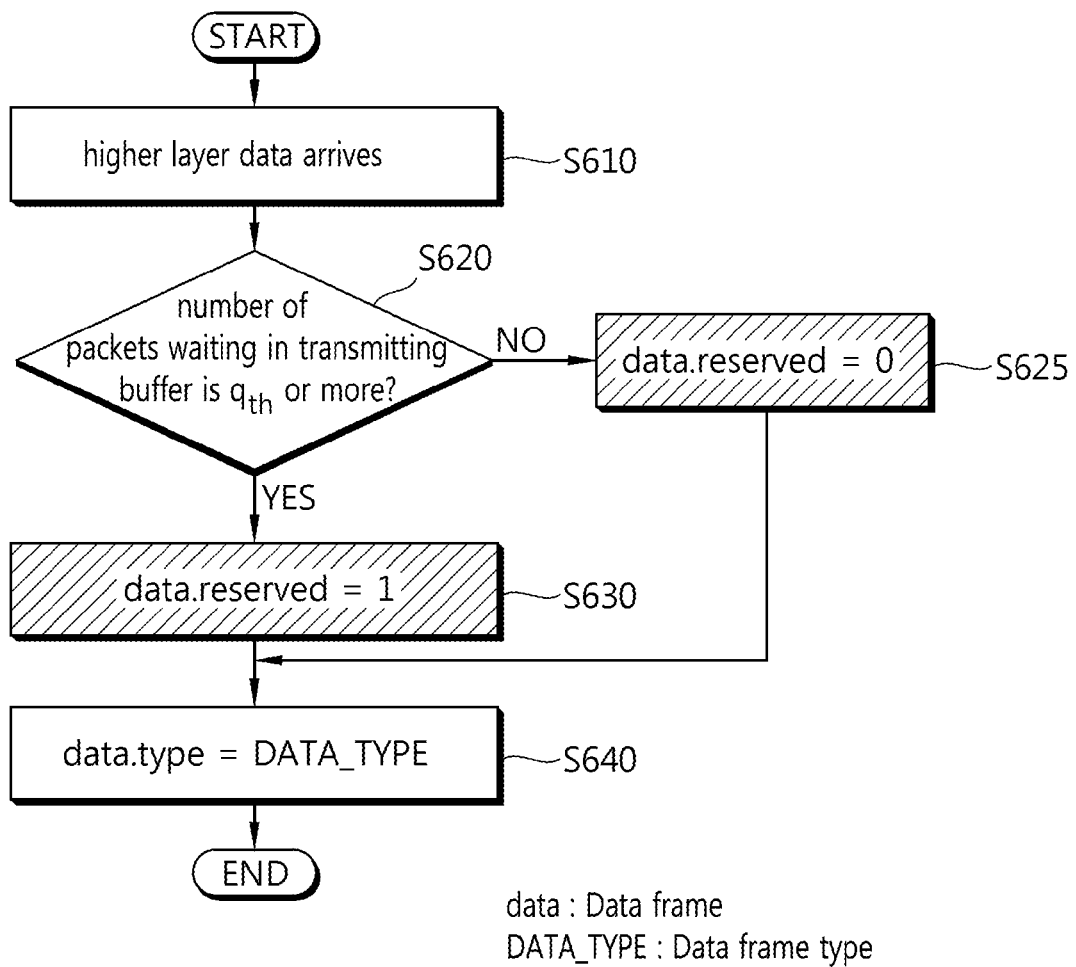
FIG. 6 is a flowchart schematically illustrating a process for generating a data frame in a method for reserving data transmission in a receiver-initiated asynchronous MAC protocol according to an example embodiment of the present invention.

FIG. 6 is a flowchart schematically illustrating a process for generating a data frame in a method for reserving data transmission in a receiver-initiated asynchronous MAC protocol according to an example embodiment of the present invention.

Referring to FIG. 6, if higher layer data arrives at a data transmission reserving apparatus (which may be a transmitting node such as node 2 or 3 in FIG. 1) (S610), it is determined whether the number of packets waiting in a transmitting buffer is not less than a threshold ($q_{th}$)(S620). In case the packet is not more than the threshold, the waiting packet and the data that has arrived may be generated into a single data frame, and in this case, there is no need for reservation, and thus, the reserved field may be set to 0 (S625).

In case the packet is not less than the threshold, it should be generated into two or more data frames, and accordingly, in case it wins the backoff contention, the reserved field may be set to 1 in order to reserve next data transmission (S630).

The frame type information is then set to a data frame type (S640), generating a data frame.

Figure 7:
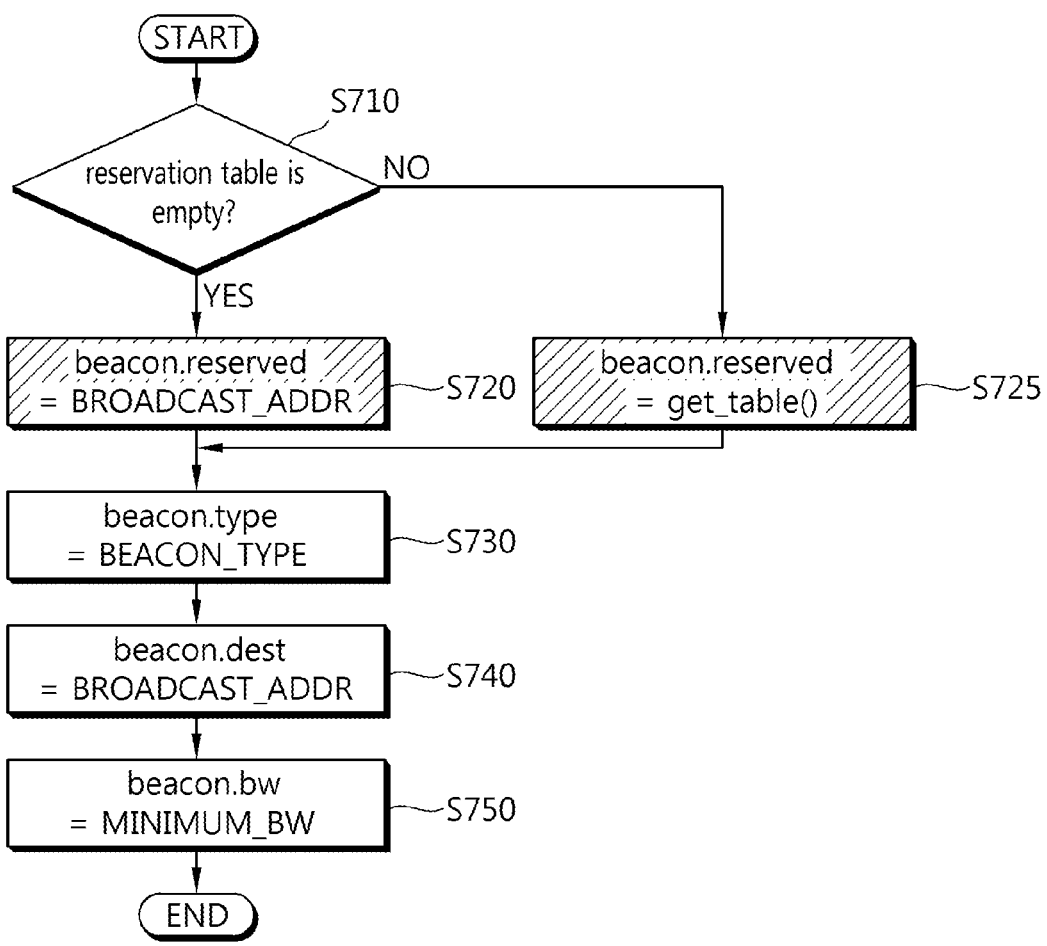
FIG. 7 is a flowchart schematically illustrating a process for generating a base beacon frame in a method for reserving data transmission in a receiver-initiated asynchronous MAC protocol according to an example embodiment of the present invention.

FIG. 7 is a flowchart schematically illustrating a process for generating a base beacon frame in a method for reserving data transmission in a receiver-initiated asynchronous MAC protocol according to an example embodiment of the present invention.

Referring to FIG. 7, the data receiving apparatus (which may be a receiving node such as node 1 in FIG. 1), when generating a base beacon frame, first identifies whether the reservation table is empty (S710). If the reservation table is empty, it may set the broadcast address in the reserved field of the beacon frame in order to indicate that there is no reserved transmitting node (S720). If the reservation table is not empty and there are one or more transmitting nodes, it may fetch one address from the reservation table and record in the reserved field. In this case, if there are two or more transmitting nodes, it may consider the priority information and may record a transmitting node with a higher priority. After recording the address in the reserved field, it may delete the address from the reservation table. Thereafter, it sets the beacon frame type information (S730) and sets the destination information of the beacon frame to the broadcast address (S740). Since the base beacon frame is broadcast to all of the transmitting nodes, this is to set the destination information to the broadcast address. Thereafter, it sets a minimum backoff window to the backoff window (S750) and generates a base beacon frame.

Figure 8:
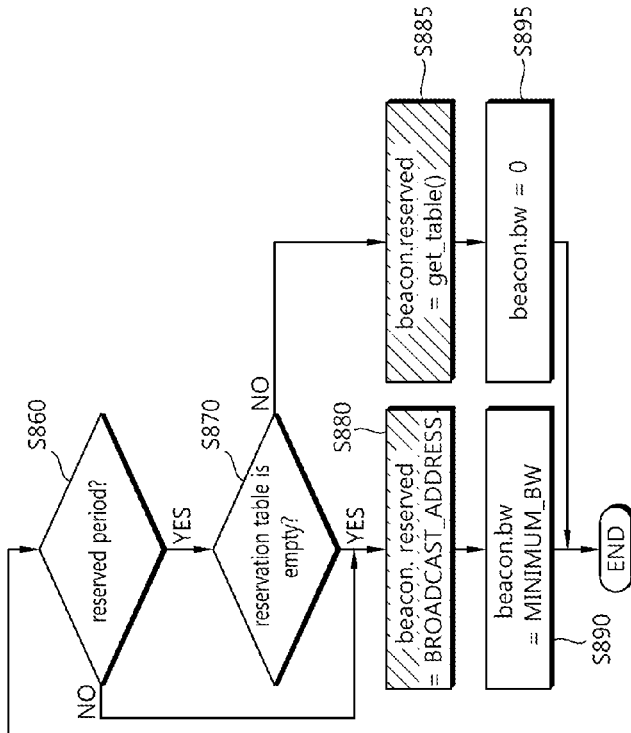
FIG. 8 is a flowchart schematically illustrating a process for generating a response beacon frame in a method for reserving data transmission in a receiver-initiated asynchronous MAC protocol according to an example embodiment of the present invention.
Figure 8:
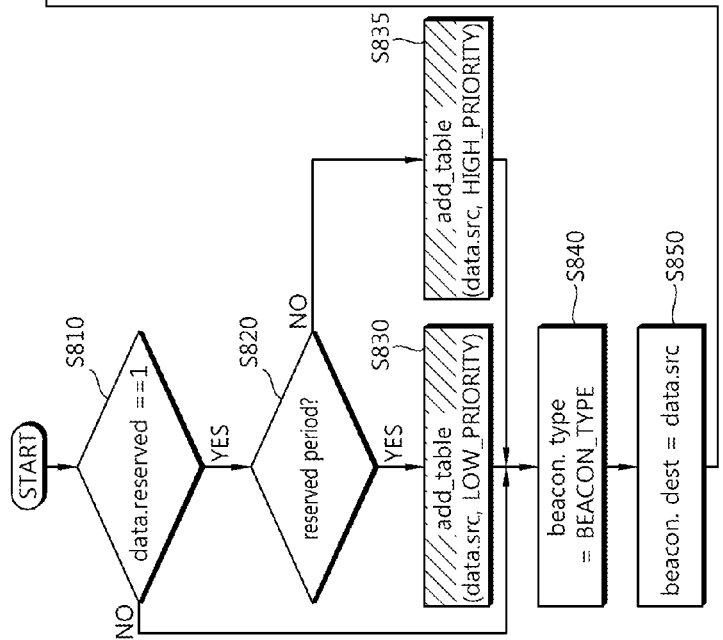

FIG. 8 is a flowchart schematically illustrating a process for generating a response beacon frame in a method for reserving data transmission in a receiver-initiated asynchronous MAC protocol according to an example embodiment of the present invention.

Referring to FIG. 8, the data receiving apparatus (not shown) (which may be a receiving node such as node 1 in FIG. 1), when generating a response beacon frame, first identifies whether the reserved field in the received data frame is 1 (S810). If the reserved field is 1, it identifies whether the period during which the current data frame is received is the reserved period (S820). This is why, using the fact that the transmission reservation contained in the data transmitted during the reserved period has no contention with other nodes in the reserved period, a plurality of data frames may be consecutively sent in a non-contentious manner rather than transmitting one data frame, and if so, the other nodes cannot participate in the contention, resulting in inefficiency. It does not matter if the other nodes do not have any data frames to send either. However, if the other nodes have data frames subject to reservation transmission, the transmission reservation through the reserved field value included in the data frame transmitted within the reserved period has a lower priority than other normal transmission reservations (transmission reservations through data frames transmitted in the contentious period). In other words, the data receiving apparatus, in case the reserved field in the data frame received during the reserved period is 1, adds the transmitting node having transmitted the frame to the reservation table while also adding the data source address and priority information (indicating being a lower priority) (S830). In contrast, if the reserved field in the data frame received within a period other than the reserved period is 1, the data receiving apparatus adds the transmitting node having transmitted the frame to the reservation table while also adding the data source address and priority information (information indicating being a higher priority) (S835).

Then, the data receiving apparatus adds beacon frame type information (S840) and sets destination information by referencing the source information on the data frame received (S850). Then, the data receiving apparatus determines whether the period during which the response beacon frame is transmitted is a reserved period (S860). This is why the reserved period is a period agreed on between the transmitting node and the receiving node per duty cycle and there may be a plurality of periods. In other words, after receiving the data transmission frame in the reserved period, it may transmit a response beacon frame in the reserved period. In case as a result of the determination in step S860, if the period is not the reserved period, the data receiving apparatus sets a broadcast address to the reserved field in order to inform that there is no reserved node (S880). Then, the data receiving apparatus sets a minimum backoff window size to the backoff window (S890) and generates a response beacon frame. The data receiving apparatus identifies whether the reservation table is empty in case the period is the reserved period (S870), and if empty, sets a broadcast address to the reserved field in order to inform that there is no reserved node (S880). Then, the data receiving apparatus sets a minimum backoff window size to the backoff window (S890) and generates a response beacon frame.

In case as a result of the determination in step S860, the period is the reserved period and as a result of the determination in step S870, there are one or more transmitting nodes in the reservation table, the data receiving apparatus obtains one address from the reservation table and records the same in the reserved field of the payload of the response beacon frame (S885). In this case, it obtains one address with the highest priority in the reservation table while simultaneously deleting the address from the table. Then, it sets the backoff window value to 0 (S895) and generates a response beacon frame.

Figure 9:
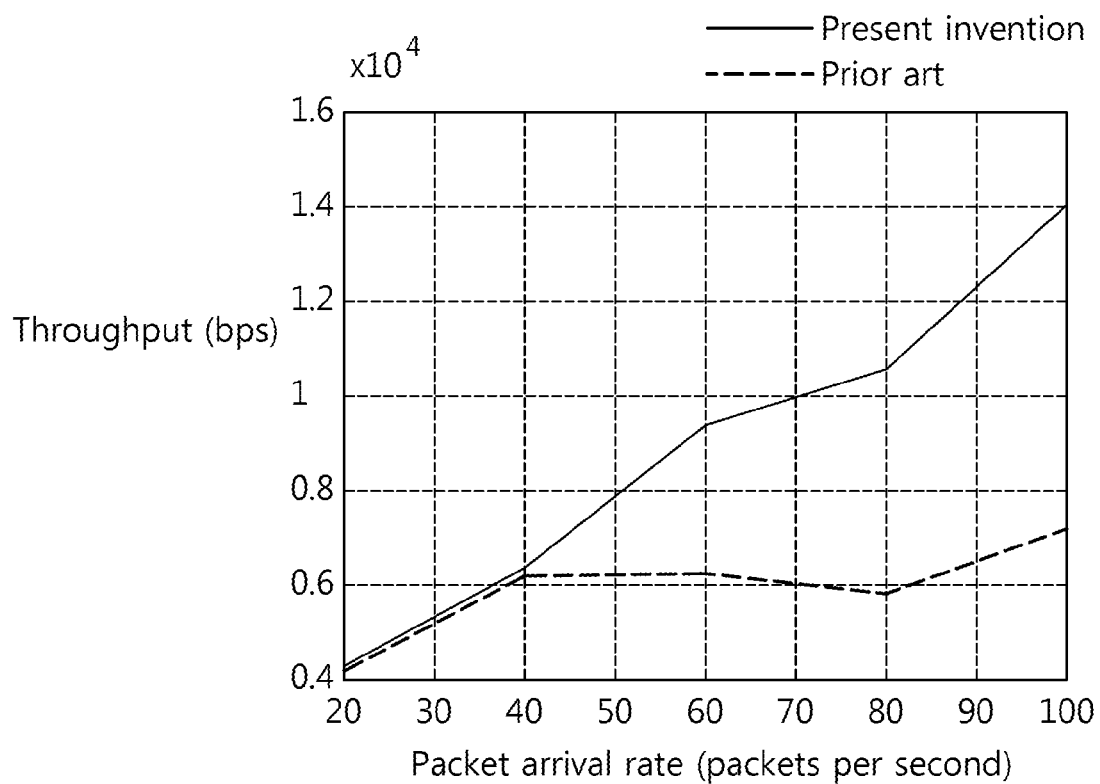
FIG. 9 is a graph illustrating comparison in throughput performance between a conventional method and a data transmission reserving method in a receiver-initiated asynchronous MAC protocol according to an example embodiment of the present invention.

FIG. 9 is a graph illustrating comparison in throughput performance between a conventional method and a data transmission reserving method in a receiver-initiated asynchronous MAC protocol according to an example embodiment of the present invention.

For comparison in throughput performance between the present invention and the prior art, the two techniques were implemented on TinyOS and were mounted in short-range communication-enabled IEEE 802.15.4 compatible mote for measuring throughput performance. Three nodes were used, with node 1 set to a receiving node while node 2 and node 3 being set to transmitting nodes. The number of data frames generated in one second in node 2 and node 3 were set to 20, 40, 60, 80, and 100. The node sleep period was set to one second, and the throughput performance was measured every ten seconds. Comparison was made as to averages of values measured ten times.

As shown in FIG. 9, in the case of light data traffic, i.e., not more than 40 packets/s, it can be seen that the throughput performance is substantially similar between the present invention and the prior art because it is before the throughput performance is saturated and little collision occurs so that application of the present invention does not contribute a lot to mitigation of collision through transmission chance reservation and its resultant throughput performance. However, when the data traffic is 60 packets/s or more, it could be verified that the present invention leads to increased throughput performance as the traffic increases whereas the prior art presents saturated and steady throughput performance.

Although the present invention has been shown and described in connection with example embodiments thereof, it should be appreciated by one of ordinary skill in the art that various changes in form and details may be made thereto without departing from the scope of the present invention defined in the following claims.

What is claimed is:
1. A method to reserve data transmission from a transmitting node to a receiving node in a receiver-initiated asynchronous MAC (Medium Access Control) protocol, the method comprising:
receiving a base beacon frame from the receiving node; and
transmitting a data frame with a reserved field value set in a portion of a header of the data frame to the receiving node;
receiving a response beacon frame from the receiving node; and
identifying address information contained in a reserved field of the response beacon frame to determine whether a reserved transmitting node is designated,
wherein the identifying of the address information comprises transmitting a data frame during a corresponding reserved period of a next duty cycle, in response to the reserved field of the response beacon frame comprising address information consistent with the address information of the transmitting node or broadcast address information.

2. The method of claim 1, wherein the transmitted data frame comprises frame type information, destination information, source information, reserved field value information, and data.

3. The method of claim 1, further comprising setting the reserved field value to 1, in response to there being additional data to be sent, or setting the reserved field value to 0, in response to there not being additional data to be sent.

4. The method of claim 1, wherein the identifying of the address information further comprises holding data transmission in the reserved period, in response to the reserved field of the response beacon frame comprising address information inconsistent with address information of the transmitting node.

5. The method of claim 1, wherein the reserved period is a designated contentious period of the duty cycle and is a period agreed on between the transmitting node and the receiving node.

6. The method of claim 1, wherein the transmitting node and the receiving node operate in a sensor network.

7. An apparatus to reserve data transmission to a receiving node in a receiver-initiated asynchronous Medium Access Control (MAC) protocol, the apparatus comprising:
a receiving unit configured to receive a base beacon frame from the receiving node, to receive a response beacon frame from the receiving node, and to identify address information contained in a reserved field of the response beacon frame to determine whether a reserved transmitting node is designated; and
a transmitting unit configured to transmit a data frame to the receiving node with a reserved field value set in a portion of a header of the data frame,
wherein the identifying of the address information comprises transmitting a data frame during a corresponding reserved period of a next duty cycle, in response to the reserved field of the response beacon frame comprising address information consistent with the address information of the transmitting node or broadcast address information.

8. A method to receive data in a receiving node received data from at least one transmitting node in a receiver-initiated asynchronous Medium Access Control (MAC) protocol, the method comprising:
broadcasting a base beacon frame to the at least one transmitting node;
receiving a data frame from the at least one transmitting node;
parsing a reserved field value contained in a header of the received data frame to generate a response beacon frame; and
transmitting the response beacon frame to the at least one transmitting node, wherein the generating of the response beacon frame comprises
parsing to determine whether the reserved field value of the received data frame is set to 1,
adding the first transmitting node to a reservation table, in response to a first transmitting node performing transmission with the reserved field value set to 1, and
setting an address of the first transmitting node in the reserved field of the response beacon frame by referencing the reservation table to generate the response beacon frame.

9. The method of claim 8, wherein the generating of the response beacon frame comprises simultaneously receiving at least two data frames to sense a collision wherein a backoff window value is included in the response beacon frame to generate the response beacon frame.

10. The method of claim 9, further comprising,
in response to the receiving node that waking up after a corresponding duty cycle ends, transmitting a base beacon frame of a next duty cycle, setting the address of the first transmitting node in the reserved field by referencing the reservation table, and transmitting the address of the first transmitting node.

11. The method of claim 9, wherein in response to there being a plurality of first transmitting nodes that set the reserved field value to 1 and transmit the reserved field value, a priority of a transmitting node of the plurality of first transmitting nodes requesting a reservation through a data frame transmitted in a period other than a reserved period is higher than a priority of a transmitting node of the plurality of first transmitting nodes requesting a reservation through a data frame transmitted in the reserved period.

12. The method of claim 11, wherein when adding the first transmitting node to the reservation table, an address and priority information of the first transmitting node are added together, and wherein upon generation of the response beacon frame, an address of a first transmitting node with a highest priority is included in the reservation table, and the first transmitting node is deleted from the reservation table.

13. The method of claim 11, wherein the reserved period is a designated contentious period of a duty cycle and wherein the reserved period is a period agreed on between the transmitting node and the receiving node.

14. An apparatus to receive data from at least one transmitting node in a receiver-initiated asynchronous Medium Access Control (MAC) protocol, the apparatus comprising:

a transmitting unit configured to broadcast a base beacon frame or a response beacon frame to the at least one transmitting node;
a receiving unit configured to receive a data frame from the at least one transmitting node; and
a controller configured to parse a reserved field value included in a header of the received data frame to generate a response beacon frame, wherein the generating of the response beacon frame comprises
parsing to determine whether the reserved field value of the received data frame is set to 1,
in response to there being a first transmitting node performing transmission with the reserved field value set to 1, adding the first transmitting node to a reservation table, and
setting an address of the first transmitting node in the reserved field of the response beacon frame by referencing the reservation table to generate the response beacon frame.

15. An apparatus to transmit data between at least one transmitting node and a receiving node in a receiver-initiated asynchronous MAC (Medium Access Control) protocol, the apparatus comprising:
at least one transmitting node configured to receive a base beacon frame or response beacon frame from the receiving node and to transmit a data frame to the receiving node with a reserved field value set in a portion of a header of the transmitted data frame; and
a receiving node configured to transmit a base beacon frame or a response beacon frame to the at least one transmitting node, to receive a data frame from the at least one transmitting node, and to parse the reserved field value included in the header of the received data frame to generate a response beacon frame, wherein the generating of the response beacon frame comprises
parsing to determine whether the reserved field value of the received data frame is set to 1,
in response to there being a first transmitting node performing transmission with the reserved field value set to 1, adding the first transmitting node to a reservation table, and
setting an address of the first transmitting node in the reserved field of the response beacon frame by referencing the reservation table to generate the response beacon frame.

* * * * *